C. W. SPICER.
UNIVERSAL JOINT.
APPLICATION FILED AUG. 3, 1910.
996,156.
Patented June 27, 1911.
2 SHEETS—SHEET 1.
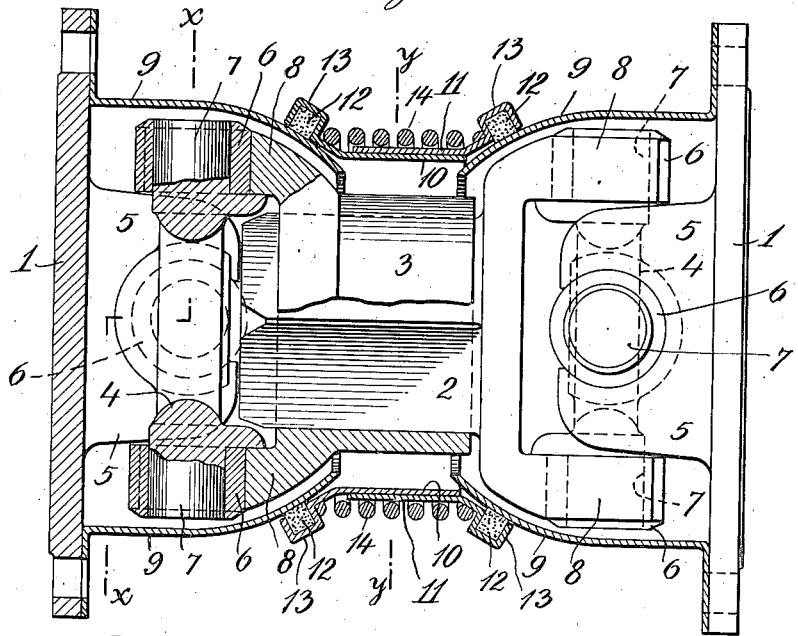
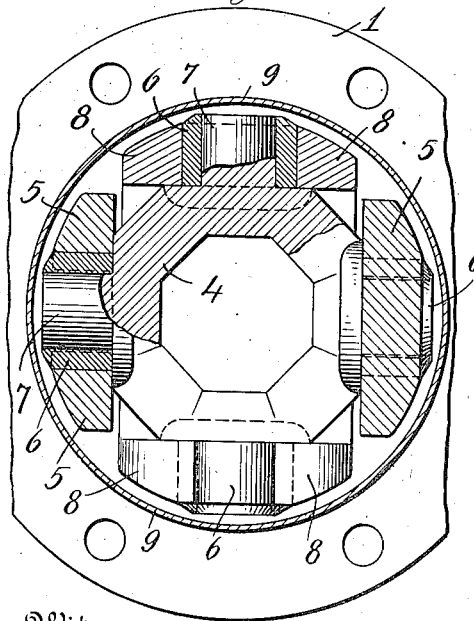
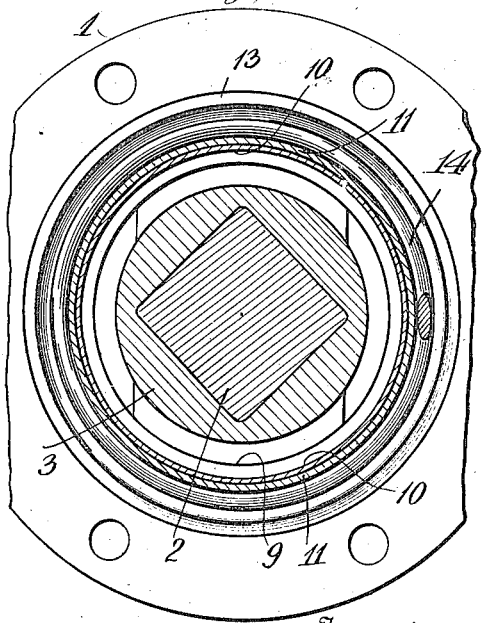
Witnesses:
Max B. A. Doring
Paul H. Frank
Inventor
C. W. Spicer
By his Attorneys
Marble + Matty

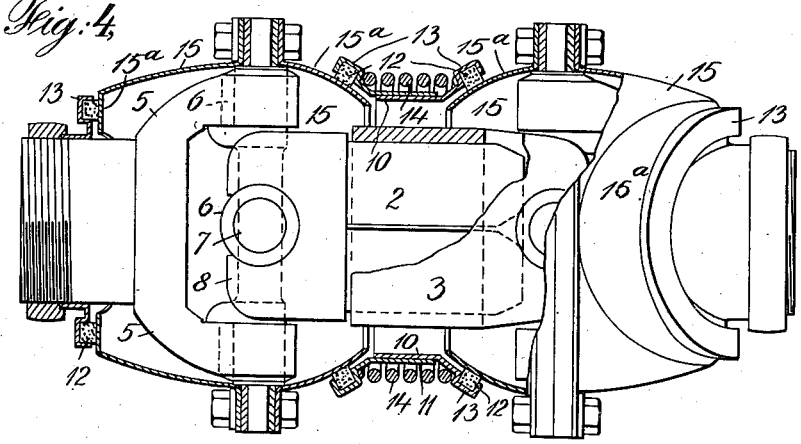
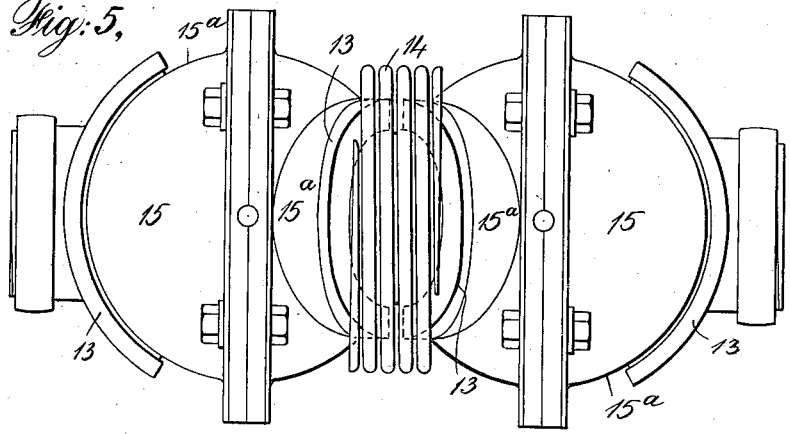
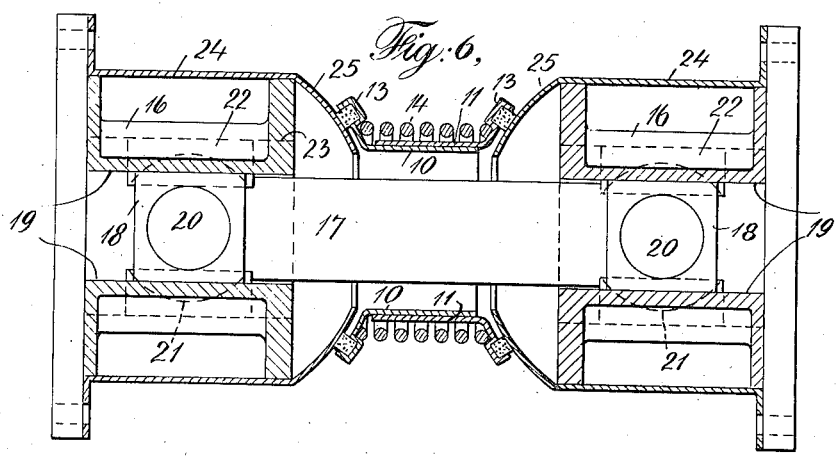

UNITED STATES PATENT OFFICE.

CLARENCE W. SPICER, OF PLAINFIELD, NEW JERSEY.

UNIVERSAL JOINT.

996,156.  Specification of Letters Patent. Patented June 27, 1911.

Application filed August 3, 1910. Serial No. 575,333.

*To all whom it may concern:*

Be it known that I, CLARENCE W. SPICER, a citizen of the United States of America, and a resident of Plainfield, county of Union, and State of New Jersey, have invented certain new and useful Improvements in Universal Joints, of which the following is a specification.

My invention relates to double universal joints, wherein two universal joints are included within the same structure, also to combined universal and slip joints, and to incased double universal joints; and my invention consists in the novel features of construction and arrangement hereinafter described and particularly pointed out in the appended claims.

The objects of my invention are to improve the construction of universal joints and particularly of double universal joints, combined universal and slip joints, and incased universal joints, and to make such joints simple, compact, efficient, durable and reliable.

I will now proceed to describe my invention with reference to the accompanying drawings and will then point out the novel features in claims.

In said drawings: Figure 1 shows an elevation and partial longitudinal section of a double incased universal joint and slip joint embodying my invention; Fig. 2 shows a transverse section of said joint on the irregular section line x—x of Fig. 1; Fig. 3 shows transverse section through the slip joint and case on the line y—y of Fig. 1. Fig. 4 shows a longitudinal elevation and partial section of a similar double universal joint provided with an alternative form of casing, and Fig. 5 is another elevation of such joint, the plane of the view being at right angles to that of Fig. 4. Fig. 6 shows a longitudinal section of a further alternative structure, in which each of the two universal joints is of the so-called "T-head in slot" type, embodying, therefore, both a universal joint and a slip joint.

The universal joints shown in the figures above referred to, while well adapted for general use, are especially adapted for use in automobiles, between the motor and transmission mechanism, where the parts are normally in line but may for one reason or another get out of line. The constructions here shown will permit the efficient transmission of power from one shaft or rotating member to another shaft or rotating member, when the axis of rotation of one such member is offset somewhat, with relation to the axis of rotation of the other member, whether said axes be also angularly related or not. The universal joints shown in said figures are not, however, restricted to use between the motor and transmission mechanism of automobiles, but are adapted for use wherever rotation is to be transmitted from one member to another, and where the axes of rotation of the two members are or may get out of line, either angularly or by reason of an offset of the one axis with respect to the other. The slip joints comprised in these universal joints provide sufficient longitudinal movement not only to allow for the longitudinal movement necessary in the angular operation of the joints, but also to allow for clutch movement or gear shifting in automobile transmissions and the like.

Referring first to Figs. 1, 2 and 3, the joint structure shown in these drawings comprises two similar universal joints each substantially of the construction shown in my Patent No. 826,448, dated July 17, 1906, comprising each, a disk 1, adapted to be secured to a shaft flange or to a fly wheel, or to other suitable rotating driving or driven members, and a shaft member, numbered 2, in the one case and 3 in the other case, said two shaft members fitting one within the other so as to form a slip joint, as hereinafter described; and trunnion blocks 4. The two members 1 are provided with bearing-horns 5 within which fit bearing bushings 6 surrounding journals 7 projecting from the trunnion blocks 4; and the shaft members 2 and 3, have corresponding bearing horns 8 receiving similar bearing bushings 6 fitting over other similar journals 7 projecting from the trunnion blocks. This construction of universal joint is now well known and requires no further description here either as to construction or as to operation.

Shaft 2 is square, as indicated in both Figs. 1 and 3, and shaft member 3 is provided with a corresponding square aperture receiving member 2, the two together forming a slip joint which, owing to the massiveness of the parts, and to the considerable length of engaging surfaces, are adapted to transmit relatively great torque and, at the same time, to permit considerable longitudinal motion of the one universal joint with respect to the other.

To each disk member 1 is secured a casing member 9, these two casing members facing toward each other and being curved approximately spherically near their proximate ends. They also embrace the approximately spherically curved rear sides of the bearing-horns of members 2 and 3. To close the space between these two casing members 9, I provide a telescopic closure comprising two tubular members 10 and 11 fitting one within the other, the one engaging the spherical surface of one casing member 9, the other engaging the corresponding surface of the other member 9, both of these telescopic members preferably provided with packing material 12 located within grooved ribs 13 formed on said telescopic members by pressing or spinning or similar operation; and said closure comprises further a compression spring 14 surrounding said members, and bearing at the ends against the said ribs 13 and tending to press the two members apart and thereby to hold them in engagement with the said spherical surfaces. By the construction thus described the working parts of the two universal joints and of the slip joint formed by members 2 and 3, are completely inclosed and the casing formed by members 9, 10 and 11, said casing closed at its ends by members 1, is so tight that it may contain lubricant and will retain such lubricant for a long period of time, besides excluding dust, water, etc.

As is well known, for the transmission of uniform rotary motion by universal joints from one shaft to another shaft angularly related to it, two universal joints are required. The structure described provides such two joints within a single compact inclosure and also permits the two members 1 to rotate even though their axes of rotation be considerably offset with respect to one another.

The form of the casing members immediately inclosing the universal joints is not necessarily spherical. In Figs. 4 and 5 I illustrate casing members there designated by numerals 15 which are of the type illustrated in Fig. 4 of my Patent No. 958,023; that is to say, said casing members have working surfaces 15ª of cylindrical curvature, the axes of such cylindrically curved surfaces being at right angles and intersecting at the center of the point; the axis of each such cylindrical surface being substantially the same as the axis about which its corresponding member of the universal joint oscillates. In other respects this joint shown in Figs. 4 and 5 is substantially the same as that shown in Figs. 1, 2 and 3. The universal joints themselves are not necessarily of the type shown in Figs. 1, 2 and 4, but may be joints of other type—for example, of the "T-head in slot" type. Such a joint is illustrated in Fig. 6. The construction of the individual universal joints of this structure is substantially that illustrated in my Patent No. 919,651, dated April 27, 1909, each such joint comprising a jaw member 16 and a shaft member 17, the jaw member 16 having a transverse slot the surfaces of which form guides for bearing blocks 18 adapted to slide between ways 19 formed on jaw member 16, said bearing blocks 18 being mounted upon pivot pins 20 projecting from a spherically curved head 21 provided on the end of shaft member 17; this spherical head 21 fitting within a bearing bushing or bearing box 22, the internal curvature of which is spherical, corresponding to that of the head 21, the external form of this head corresponding to the form of the corresponding surfaces 23 of the jaw member 16. As explained in my said Patent No. 919,651, such a joint is a combined universal joint and slip joint. The jaw member 16 is provided with an inclosing casing member 24 having an end 25 which is approximately spherical. Telescopic sleeves 10 and 11 corresponding substantially in all respects to the similarly numbered sleeves, of the joint shown in Figs. 1, 2 and 3, bear at their ends against these spherically curved end pieces 25, being forced thereagainst by a spring 14.

Since in the construction shown in Fig. 6 the universal joints themselves are slip joints, there is no occasion for providing a special slip joint between the two universal joints, as in the construction shown in Figs. 1–5 inclusive.

In another Patent No. 806,592, dated December 5, 1905, I have illustrated another incased double universal joint comprising also a slip joint, but which differs in construction somewhat from the joints herein illustrated and described. These joints, while embodying the broad invention of the joint of said patent, possess numerous advantages of structure and are more compact.

What I claim is:—

1. An incased universal joint for power transmission, comprising in combination two connected power transmitting universal joints provided with casing members, and a closure intermediate said members and comprising two telescopically-related members, one bearing against the one casing member, and the other against the other casing member.

2. An incased universal joint for power transmission, comprising in combination two connected power transmitting universal joints provided with casing members, and a closure intermediate said members and comprising two telescopically-related members, one bearing against the one casing member, and the other against the other casing member, and a spring tending to press said telescopic members apart.

3. An incased universal joint for power transmission, comprising in combination two connected power transmitting universal joints provided with casing members curved approximately spherically near their proximate ends, and a closure intermediate said members and comprising two telescopically-related members, one bearing against the approximately spherically curved portion of the one casing member, and the other against the corresponding portion of the other casing member.

4. An incased universal joint for power transmission, comprising in combination two connected power transmitting universal joints provided with casing members curved approximately spherically near their proximate ends, and a closure intermediate said members and comprising two telescopically-related members, one bearing against the approximately spherically curved portion of the one casing member, and the other against the corresponding portion of the other casing member, and a spring tending to press said telescopic members apart.

5. An incased universal joint for power transmission, comprising in combination two connected power transmitting universal joints provided with casing members, and having a slip-joint connection with each other, and a closure intermediate said members and comprising two telescopically-related members, one bearing against the one casing member, and the other against the other casing member, and also comprising means keeping said telescopically-related members in contact with their respective casing members during action of the slip-joint connection.

6. An incased universal joint for power transmission, comprising in combination two connected power transmitting universal joints provided with casing members, and having a slip-joint connection with each other, and a closure intermediate said members and comprising two telescopically-related members, one bearing against the one casing member, and the other against the other casing member, and also comprising a spring for keeping said telescopically-related members in contact with their respective casing members during action of the slip-joint connection.

7. An incased universal joint for power transmission, comprising in combination two connected power transmitting universal joints provided with casing members, and a closure intermediate said members and comprising two telescopically-related members, each comprising a rib forming a spring seat, and a spring seated against said ribs and tending to press said telescopic members apart.

8. An incased universal joint for power transmission, comprising in combination two connected power transmitting universal joints provided with casing members, and a closure intermediate said members and comprising two telescopically-related members, each comprising a rib forming a spring seat, and a spring seated against said ribs and tending to press said telescopic members apart, said ribs grooved on their inner sides, and provided with packing material within said grooves.

9. A double universal joint for power transmission, comprising in combination two power transmitting universal joints each comprising driving and driven members universally-connected, the driving member of one such joint and the driven member of the other such joint comprising the one a projection of non-circular section, the other a projection provided with an aperture of corresponding non-circular section receiving the said projection of the other member, and forming therewith a slip joint, said two joints each comprising a casing member, and a closure, intermediate said casing members and comprising two telescopically-related members, one bearing against the one casing member, and the other against the other casing member, and further comprising means tending to force said casing members apart, whereby during action of the slip joint the said telescopic closure correspondingly extends or shortens as the case may be.

In testimony whereof I have signed this specification in the presence of two subscribing witnesses.

CLARENCE W. SPICER.

Witnesses:
J. W. B. PEARCE,
ALFRED M. MORRELL.